United States Patent [19]

Schneider

[11] Patent Number: 4,631,114

[45] Date of Patent: Dec. 23, 1986

[54] METHOD FOR REMOVING A SURFACE LAYER FROM A METAL FLUORIDE GLASS

[75] Inventor: Hartmut Schneider, Munich, Fed. Rep. of Germany

[73] Assignee: Siemens Aktiengesellschaft, Berlin and Munich, Fed. Rep. of Germany

[21] Appl. No.: 840,582

[22] Filed: Mar. 12, 1986

[30] Foreign Application Priority Data

Apr. 18, 1985 [DE] Fed. Rep. of Germany ....... 3514082

[51] Int. Cl.$^4$ ............................................. C03C 15/00
[52] U.S. Cl. ...................................... 156/663; 65/31; 65/DIG. 16
[58] Field of Search .................. 156/663; 252/79.2; 65/31, 3.15, DIG. 16; 501/904, 44; 350/96.34, 96.1, 96.29, 96.30

[56] References Cited

U.S. PATENT DOCUMENTS

| | | | |
|---|---|---|---|
| 3,446,682 | 5/1969 | Wawner | 252/79.2 X |
| 3,930,870 | 1/1976 | Basi | 252/79.2 X |
| 4,049,413 | 9/1977 | French | 65/3.15 |
| 4,445,755 | 5/1984 | Ohsawa et al. | 350/96.34 |

FOREIGN PATENT DOCUMENTS

| | | | |
|---|---|---|---|
| 55-29020 | 7/1980 | Japan | 65/31 |
| 57-166336 | 10/1982 | Japan | 501/904 |
| 2071080 | 9/1981 | United Kingdom | 501/904 |
| 2122599 | 1/1984 | United Kingdom | 65/3.15 |

OTHER PUBLICATIONS

Marcel Poulain: Halide Glasses, J. Non-Crystalline Solids 56, (1983), 1–14, North Holland Publishing Company.
Proc. 8th Europe Conf. Opt. Comm.; Cannes, 1982, S81–83.
Communications of the American Ceramic Society 67, (1984), C-238 through C-239.
The Chemical Behavior of Zirconium, Van Nostrand, Princeton, 1958, S. 143.

*Primary Examiner*—Kenneth M. Schor
*Attorney, Agent, or Firm*—Hill, Van Santen, Steadman & Simpson

[57] ABSTRACT

A method for removing a surface layer from a metal fluoride glass containing barium ions, particularly glass rods of the type used for manufacturing fibers for optical communications technology. A rapid, uniform and turbidity-free erosion of a disturbed outside layer of the starting glass is accomplished with an etchant solution in which a fluoride complexing agent or a barium complexing agent is dissolved. In particular, a rapid dissolving of a barium fluoro-zirconate glass is achievable with an etchant solution containing acidic Zr (IV) salts, whereby the risk of contaminating the so etched surface by the etchant solution does not exist.

15 Claims, 3 Drawing Figures

METHOD FOR REMOVING A SURFACE LAYER FROM A METAL FLUORIDE GLASS

BACKGROUND OF THE INVENTION

1. Field of the Invention

This invention lies in the field of techniques for surface treatment of metal fluoride glass, particularly such glass which is suitable for the manufacture of fibers for optical communications technology.

2. Prior Art

Optical fibers based on silica glass which have their maximum transparency at the wavelength 1.5 μm are presently employed in optical communications technology. For low attenuations, materials have been developed whose infrared absorption edge is shifted toward greater wavelengths and which are as good as, or better than, the known silica glass in terms of their scattering behavior. Halides particularly come into consideration here. In addition to the infrared absorption shift in the direction toward greater wavelengths by about 3-4 μm in comparison to the oxides, it is particularly fluoride glasses which also exhibit adequate hydrolysis resistance. Whereas only fluoride glasses on the basis of highly toxic $BeF_2$ were hitherto known, glasses of heavy metal fluorides which are less physiologically precarious can also be manufactured since 1975. The basic components herein are the tetravalent fluorides $ZrF_4$, $HfF_4$, $ThF_4$ and their mixtures or the trivalent fluorides $AlF_3$, $ScF_3$ and $YF_3$ as well as the bivalent fluorides such as, for example, $CdF_2$. However, these main components only yield respective glass-forming melts in mixture with $BaF_2$ (in this regard, see Marcel Poulain: Halide Glasses, J. Non-Cryst. Solids 56 (1983) 1-4).

Chemically, thus, it is a matter of barium salts of the complex fluoro-metallic acids. The crystallization tendency of the melts during cooling can be reduced by additives of chemically related fluorides, such as $AlF_3$, $LaF_3$, $GdF_3$, $PbF_2$, $NaF$ or $LiF$. For transparent glasses, however, a rapid quenching is necessary, this only being achieved by means of a contact of the hot melt with a colder metal surface. This usually leads to samples which are more or less contaminated by foreign substances at their surface. Experience has taught that only fibers having low mechanical stability can be drawn from such glass rods obtained by means of mold casting.

A known method of resolving this problem is to mechanically polish the rods before the fiber-drawing and to thereby improve the stability (see, in this regard, H. Poignant, J. Le Mellot, Y. Bossis, "Infrared Fluorozirconate and Fluorohafnate Glass Optical Fibers", Proc. 8th Europ. Conf. Opt. Comm. Cannes, 1982, pp. 81-83). The hazard of contamination by grinding particles, however, thereby exists. Moreover, the glass surface easily becomes cloudy given contact with aqueous agents, this likewise having been described and being attributable to an ion interchange $F^-$ with $OH^-$ from the aqueous phase (see, in this regard, G. H. Frischat, I. Overbeck, "Chemical Durability of Fluorozirconate Glasses, J. Amer. Ceram. Soc. 67 (1984) C-238—C-239). Measures for the removal of this cloudy layer have not yet been specified.

BRIEF SUMMARY OF THE INVENTION

In accord with the preamble of claim 1, the present invention relates to a method for removing a surface layer from a metal fluoride glass, particularly a metal fluoride glass suitable for the manufacture of fibers for optical communications technology which contains ions of at least one chemical element whose fluoride is difficultly water-soluble. The method involves contacting such a glass with an etchant solution containing at least one fluoride complexing agent and/or at least one complexing agent capable of complexing with the ions of such chemical element whose fluoride is difficulty water soluble.

A principal object of the present invention is to provide a method for removing a surface metal layer from a metal fluoride glass which provides a fast, uniform, turbidity-free erosion of a surface layer of the glass.

This object is achieved in that the surface layer of such a glass is etched off with an etchant liquid in which is dissolved at least one fluoride complexing agent and-/or at least one complexing agent capable of complexing with the ions of the chemical element whose fluoride is difficultly water-soluble. The term "difficultly water-soluble" is hereby also intended to include "water insoluble".

Other and further objects, arms, purposes, features, advantages, produced, embodiments, variations and the like will be apparent to those skilled in the art from the teachings of the present specification, claims and appended drawings.

BRIEF DESCRIPTION OF THE DRAWINGS

The invention is illustrated further in the accompanying drawings wherein.

DETAILED DESCRIPTION

Figure 1:
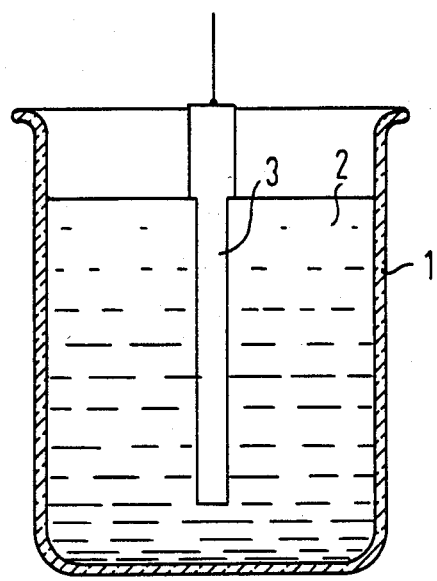
FIG. 1 is a schematic sectional view showing a fluoride glass rod suspended in an etching agent in a vessel.

The present invention provides an etching procedure which accomplishes both a rapid, uniform and turbidity-free erosion of a disturbed surface layer as well as a polishing of the resulting surface. A starting disturbed surface layer can, for examples, be a surface layer contaminated by foreign substances, be a damaged surface layer, and/or be a surface layer clouded by contact with aqueous agents.

The discovery of the present invention proceded from a suspicion that the disturbed surface layer might essentially be water-insoluble barium fluoride. For the purpose of a better understanding of the invention, let the conditions be explained with the assistance of the following reaction equations. Barium hexafluoro-zirconate was here selected as an example of the behavior of the barium fluoro-metallates wherein barium is the chemical element whose fluoride is difficultly water-soluble. Similar equations can also be formulated for the other glass-informing agents which contain ions of an element whose fluoride is difficultly water-soluble. Alkaline earths and lead thereby come into consideration first and foremost with barium being presently preferred.

Reaction equations:

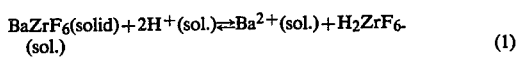

(1)

$$H_2ZrF_6(sol.) + H_2O(fl.) \rightleftharpoons H_2ZrOF_4(sol.) + 2HF(sol.) \quad (2)$$

$$Ba^{2+}(sol.) + 2HF(sol.) \rightleftharpoons BaF_2(solid) + 2H^+(sol.) \quad (3)$$

wherein:
sol. designates a solution, and
fl. designates a liquid.

The hexafluorozirconic acid which is formed according to equation (1) when the solid glass dissolves in acid can, in accord with equation (2), be partially hydrolysed by water, this then leading to the precipitation of solid $BaF_2$ on the glass surface (see equation (3) and also W. B. Blumenthal, "The Chemical Behavior of Zirconium", Van Nostrand, Princeton, 1958, p. 143).

When other elements whose fluoride is difficultly water-soluble are present, a complexing agent capable of complexing with such an element must be selected. When adding a fluoride complexing agent or a barium complexing agent, the ion concentration can be reduced to such a degree that either the $BaF_2$ precipitation, or the precipitation of the difficultly water-soluble fluoride of the corresponding element, is suppressed. In one preferred class of etchant solutions, at least one fluoride complexing agent is dissolved and substantially none of such complexing agent is capable of complexing. Thus, since, in the case of the element barium, only a few, usually weak, barium complexes are known, the selection is preferably undertaken in favor of the fluoride complexing agents which are preferably the zirconium (IV) or the titanium (IV) salts which, as known, form particularly stable fluoride complexes as illustrated by the reaction equation:

$$Zr^{4+}(sol.) + nF^-(sol.) \rightleftharpoons ZrF_n^{(4-n)+}(sol.) \quad (4)$$

wherein n is an integer of from 1 through 6. Such salts are also advantageous in combination with other glass-forming agents.

In this context, it is be pointed out that the employment of a fluoro-zirconate glass, for example, a barium fluoro-zirconate, is advantageous in the sense that zirconium itself is a glass component. When a fluoride complexing agent from the group of zirconium (IV) salts is then employed alone, such a glass has the advantage that the risk of a contamination of a surface by the etchant does not exist.

In the complex defined according to equation (4), the first fluoride ion is particularly firmly bonded, for which reason one expediently employs a noticeable Zr excess; that is, only a few, preferably at most two, fluoride ions should encounter one respective zirconium ion.

An acidic agent is preferably employed in the etchant solution. This agent, in particular, can be weakly acidic whereby, however, the pH value should be not greater than 6. The etchant solution preferably contains hydrochloric acid.

As experiments have confirmed, a rapid dissolving of a barium fluoride zirconate glass can be achieved with a solution containing an etching agent in the form of an acidic Zr (IV) salt. The etching rate can be influenced by modifying the acid concentration and the temperature. The etching rate increases with increases in the acid concentration. Glass rods suitable for the drawing of fibers for optical communications technology whose surfaces had been eroded in this fashion were capable of being drawn into fibers having noticeably improved strength and also a largely crystal-free fiber surface. Such glass rods, for example, have the molar composition $57ZrF_4 \cdot 34BaF_2 \cdot 5LaF_3 \cdot 4AlF_3$. A specific method suitable for this purpose involves contacting such glass with an etchant solution which contains 0.5 molar $Zr^{4+}$. Such solution is prepared by dissolving $ZrOCl_2 \cdot 8H_2O$ or $ZrCl_4$ in 5 weight % aqueous hydrochloric acid. During contacting, agitation is preferably employed.

In the same way, glass tubes for employment in MCVD processes (modified chemical vapor deposition processes) and adapted to be collapsed can be etched on the inside surfaces before or during the collapsing.

EMBODIMENTS

The present invention is further illustrated by reference to the following example. Those skilled in the art will appreciate that other and further embodiments are obvious and within the spirit and scope of this invention from the teachings of these present examples taken with the accompanying specification.

EXAMPLE

By dissolving $ZrOCl_2 \cdot 8H_2O$ or $ZrCl_4$ in 5 weight % aqueous hydrochloric acid, a 0.5 molar $Zr^{4+}$ solution is produced.

A portion of this solution is charged into the vessel as shown in FIG. 1. A fluoride glass rod 3 having the molar composition $57ZrF_4 \cdot 34BaF_2 \cdot 5LaF_3 \cdot 4AlF_3$ is suspended in the agitated solution 2 FIG. 1.

The rod 3 is removed after about 10 minutes, and is initially briefly (about 5 seconds) rinsed with water after which it is rinsed with propanol for about 1 minute and then dried in a gas stream. In order to improve the drying process, the drying gas ($N_2$) has a reactive component such as, for example, thionyl chloride ($SOCl_2$) added to it which component reacts at room temperature with absorbed residual water to form easily volatile hydrogen chloride. Given the described conditions, an erosion of 0.1 mm derived, this having been identified by means of diameter determination.

Figure 2:
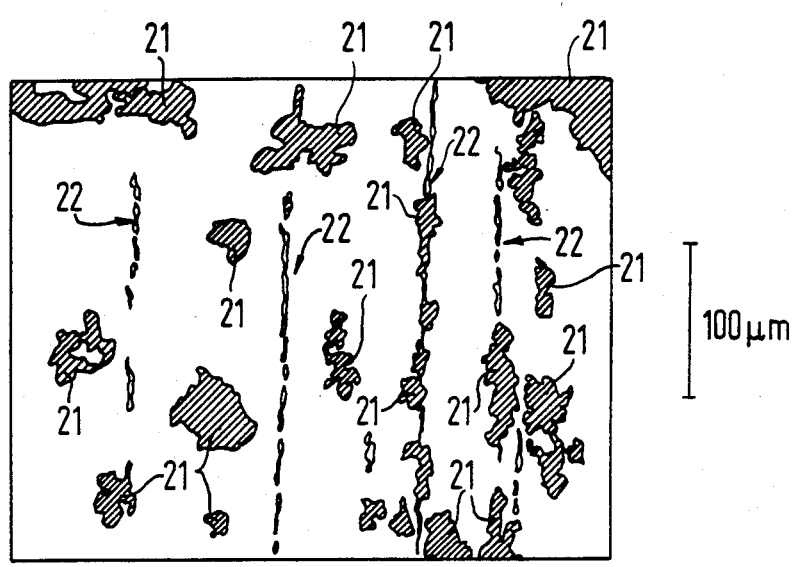
FIG. 2 is an enlarged fragmentary schematic view of a portion of the surface of the unetched rod of FIG. 1.

FIG. 2 illustrates a portion of the surface of the unetched rod 3. This surface is contaminated with foreign particles of which only the larger particles 21 have been shown. In fact, the surface is also littered with numerous foreign particles of a smaller size. Over and above this, the surface also has injuries in the form of striations 22.

Figure 3:
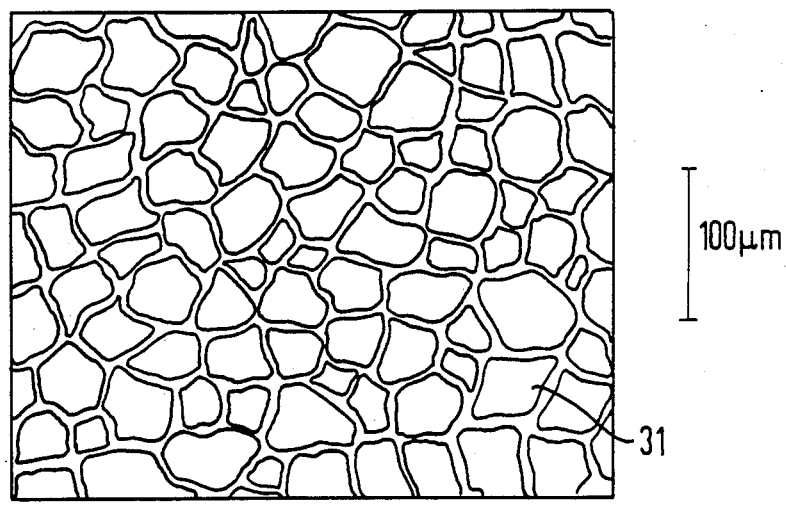
FIG. 3 is an enlarged fragmentary schematic view of a portion of the surface of the etched rod of FIG. 1.

FIG. 3 illustrates a portion of the surface of the etched rod 3. This surface is uniformly covered by rather regular, minute etched troughs 31. This surface has a beneficial influence on the quality of fiber drawn therefrom.

Although the teachings of our invention have herein been discussed with reference to specific embodiments, it is to be understood that these are by way of illustration only and that others may wish to utilize our invention in different designs or applications.

I claim:

1. A method for the removal of a surface layer from a metal fluoride glass of the type suitable for the manufacture of fibers for optical communications technology and which glass contains ions of at least one chemical element whose fluoride is difficultly water-soluble, said process comprising the step of contacting surface portions of said glass with an etchant solution for sufficient time to etch the surface portions of said glass, the etchant solution containing dissolved therein at least one material selected from the group consisting of (a) at least one fluoride complexing agent, (b) at least one complexing agent capable of complexing with the ions of said chemical element whose fluoride is difficultly water-soluble, and (c) mixtures thereof.

2. A method of claim 1 wherein said chemical element whose fluoride is difficultly water-soluble is selected from the group of elements comprising alkaline earths and lead.

3. A method of claim 2, wherein barium is selected as said chemical element whose fluoride is difficultly water-soluble.

4. A method of claim 1 wherein said etchant solution contains at least one said fluoride complexing agent and none of said complexing agent capable of complexing with said chemical element.

5. A method of claim 4 wherein said fluoride complexing agent is selected only from the group consisting of zirconium (IV) salts and titanium (IV) salts, and mixtures thereof.

6. A method of claim 5 wherein said fluoride complexing agent is selected only from the group consisting of zirconium (IV) salts.

7. The method of claim 4 wherein said metal fluoride glass is composed of a fluoro-zirconate.

8. A method of claim 4, wherein an excess of dissolved zirconium is present.

9. A method of claim 1, wherein said etchant solution is acidic.

10. A method of claim 7, wherein said etchant solution is weakly acidic.

11. A method of claim 7, wherein said etchant solution contains hydrochloric acid.

12. A method of claim 4, wherein said etchant solution contains 0.5 molar $Zr^{4+}$ and said solution is prepared by dissolving $ZrOCl_2.8H_2O$ or $ZrCl_4$ in 5 weight % aqueous hydrochloric acid.

13. The method of claim 12 wherein a glass having the molar composition $57ZrF_4.34BaF_2.5LaF_3.4AlF_3$ is contacted with said etchant solution, thereby to etch off the surface layer on said glass.

14. The method of claim 1 wherein said glass is initially in the form of a rod.

15. The method of claim 1 wherein said glass is initially in the form of a tube of the type adapted for employment in a MCVD process wherein said tube is collapsed after the inside surfaces of said tube have been so contacted.

* * * * *